Patented Oct. 17, 1939

2,176,609

UNITED STATES PATENT OFFICE 2,176,609

PROCESS OF EXTRACTING VALUES FROM COMPLEX ORES OF VANADIUM AND URANIUM

Harry McCormack, Chicago, Ill., assignor to North Shore Coke & Chemical Company, Chicago, Ill., a corporation of Delaware No Drawing. Application November 13, 1937, Serial No. 174,494

12 Claims. (Cl. 23—16)

This invention relates to process of extracting values from complex ores of vanadium and uranium; and it has to do more particularly with a process of treating such ores wherein the comminuted ore mixed with ammonium sulphate is subjected to a low temperature roast, the roasted product is then leached with water to obtain a leach solution or liquor carrying dissolved vanadium and uranium values together with suspended radium slimes, which liquor is separated from the insoluble residue; after which the suspended radium slimes are separated from the leach liquor, as by filtration, in a form suitable for working up, while the clarified leach liquor is subjected to appropriate treatment for recovering the vanadium and uranium values, the treatment of the leach liquor most desirably including recovery of useful iron and aluminum compounds as by-products in conjunction with the recovery of vanadium and uranium values.

The process of the present invention is adapted for the treatment of many different materials including ores, sands and concentrates, varying widely in specific composition but characterized essentially by the fact that they carry vanadium, uranium and radium values in association with a relatively large proportion of silica, together with numerous other constituents comprising chiefly iron and aluminum oxides and smaller percentages of the oxides of other metals such as calcium, magnesium, barium, and sometimes lead and copper. In the appended claims, the term "ore" is employed in a generic sense to cover all such materials broadly. Siliceous ores of this character carrying from 2 to 12 per cent vanadium pentoxide and from 0.25 to 3.0 per cent uranic oxide, together with radium in the customary minute quantity corresponding to the uranium content, are typically amenable to treatment by the present process. Ores or sands of this general type carrying more than about 1.5 per cent uranic oxide are usually classed commercially as carnotite ores, while those of lower uranic oxide content are ordinarily classed as vanadium ores. Many ores or sands of this class, especially those containing only relatively small percentages of vanadium and uranium, have heretofore proved extremely difficult and often impossible to work profitably.

In the prior practice, it has been customary to attack an ore of this character with sulphuric acid in order to solubilize the contained vanadium and uranium values, the comminuted ore being boiled or heated strongly with the acid either in dilute or concentrated form. It has also been proposed to roast the ore, prior to acid treatment, at temperatures of the order of 600° C. One outstanding objection to such prior procedures is that they cause the radium values to become largely fixed in the insoluble matter or residual sands in such condition that the entire residue from the subsequent leaching must be treated in order to recover the radium values, a prohibitively expensive operation in commercial work, particularly in the case of low grade ores where such insoluble residue may often amount to as much as 85 per cent of the original ore. Such fixation of the radium values, as well as production of slimes in objectionably large quantity, is due at least in part to decomposition of the silicates and hydrolysis of aluminum compounds. Handling of the large volumes of leach liquors and slimes is also attended with considerable difficulty in respect to settling and filtration. Since the commercial feasibility of any process of working such ores may depend vitally upon the ability to recover the highly valuable radium content, attempts heretofore made to commercially work ores of this general type, notably those of relatively low vanadium and uranium content, have therefore met with relatively little success and often with complete failure.

One of the principal objects of the present invention is to enable treating ores of the type in question for recovery of vanadium, uranium and radium values, in such manner that the radium values are for the most part freely separable from the insoluble matter or sands in the form of slimes suspended in a leach liquor carrying the vanadium and uranium values in solution, which slimes can then be filtered from the leach liquor to provide a relatively rich radium concentrate that can be profitably worked up for recovery of radium values, thus rendering feasible the commercial working of even relatively very low-grade complex siliceous ores.

Another object of the invention is to avoid the use, in attacking the ore to solubilize contained values, of a strong acid agent with attendant corrosion and other objectionable features, and to enable, instead, the use of an attacking agent free of these objections yet acting effectively at relatively low treating temperatures to effect the desired solubilization.

A further object of the invention is to provide a process wherein the solubilization of the contained vanadium and uranium values is so correlated to the subsequent working up of the leach liquor containing them as to enable recovery of useful by-products in connection with the recovery of vanadium and uranium values, thereby effecting further economy of operation and rendering the commercial working of such ores still more feasible.

The foregoing and other objects and advantages of the invention will appear more fully from the description hereinafter of a practical embodiment of the invention, and will then be more particularly pointed out in the appended claims.

According to the present invention, instead of attacking the ore with sulphuric acid, either with or without a preceding roast, the vanadium and uranium values are converted into soluble sulphates by subjecting the comminuted ores, in mixture with ammonium sulphate, to moderate heating or roasting at comparatively low reacting temperatures and under oxidizing conditions. This method of conversion or sulphatization, which is accomplished with surprising smoothness and completeness, has the further particularly important advantage that the radium values, instead of being largely fixed with the residual insoluble matter or sands, are left in such condition that, upon the ensuing leaching of the roasted mixture under suitable conditions of agitation, they are for the most part removed from the insoluble residue as a component of slimes of relatively small bulk, suspended in the leach liquor and readily separable therefrom subsequently as by filtration. The radium values are thus obtained as rich slime concentrates.

Even in the case of low grade ores of the type more especially in question here, this mode of attacking the ore is found to be highly effective and to enable substantially complete extraction of vanadium and uranium as sulphates and the production of a radium slime concentrate which, in typical instances, is twelve times or more as rich in radium values as the original ore.

In its broader aspects, the invention contemplates recovery of the vanadium and uranium values from the leach solution in any known or suitable manner. But in its most advantageous practical embodiments, the process of the invention includes treatment of the leach liquor in such manner as not only to recover the vanadium and uranium values, but also to obtain valuable by-products, namely, iron and aluminum alums, the commercial value of which renders the working of such ores additionally profitable and therefore more feasible commercially. The recovery of these by-products is effected by fractional crystallization from the clarified leach liquor, further ammonium sulphate being added to the liquor, if necessary, to supplement that already contained therein due to the use of an excess of ammonium sulphate in the mild roasting operation. After recovery of the alums by crystallization, the vanadium and uranium values are separated in any suitable manner but most desirably by a procedure which in certain important respects is novel and which in general involves hydrolyzation and precipitation of the vanadium values in highly oxidized condition, followed by treatment of the residual filtered solution to effect precipitation of the uranium as an alkali metal uranate, specifically sodium uranate.

In order to make still clearer the underlying principles of the invention, one desirable way of carrying it out in practice will now be described by way of typical explanatory example, without intending thereby to limit the invention to the procedural details disclosed, these latter being susceptible of wide variation within the broad scope of the invention.

In this specific example, it will be assumed that the ore to be treated is of a complex type (e. g. carnotite-roscoelite) such as may be found in Utah and Colorado. It will be further assumed that the ore contains from 2.25 to 10.5 per cent vanadium pentoxide, from 0.25 to 2.5 per cent uranic oxide, and a radium content corresponding to the percentage of uranic oxide.

A typical ore of this character may show, upon analysis, the following principal constituents:

|  | Per cent |
|---|---|
| Vanadium pentoxide | 2.37 |
| Uranic oxide | 0.42 |
| Aluminum oxide | 4.15 |
| Ferric oxide | 2.04 |
| Calcium oxide | 0.85 |
| Magnesium oxide | 0.81 |
| Insoluble ($SiO_2$) | 81.30 |
| Moisture, etc. (by diff.) | 8.06 |
|  | 100.00 |

In treating such an ore in accordance with the principles of the invention, the ore is first suitably comminuted, as by crushing to 20-mesh or finer, and is then mixed dry with a quantity of dry ammonium sulphate most desirably somewhat in excess of that necessary for the formation of sulphates of all the sulphate-forming metals known by analysis of the ore to be present therein. In the case of an ore having the typical specific analysis in the present example, the mixture comprises 50 pounds of ammonium sulphate to each 100 pounds of ore, this proportioning ensuring a substantial excess of ammonium sulphate over that theoretically required for the desired sulphatizing reaction. If the particular ore to be treated does not contain barium in amount sufficient to serve as a radium carrier, a suitable quantity of a barium salt may be added to the mix.

This dry mixture of comminuted ore and ammonium sulphate is subjected to a mild heating or roasting, with free access of air, most desirably in a rotating continuous furnace of the well known inclined cylindrical type, at temperatures sufficiently high to ensure reasonably rapid reaction but at no time high enough to cause too extensive decomposition of vanadium sulphate. The range of roasting temperatures employed in any given instance depends upon such factors as the composition of the particular ore, its degree of refractoriness, etc. In general, higher roasting temperatures are employed with ores that are relatively refractory; but in any case, the ability to solubilize effectively substantially all the uranium and vanadium values at comparatively low roasting temperatures and within a reasonably short period of time, of the order of one hour or so, is a very important feature of the process not only for the reasons already emphasized but also because of the saving in time and fuel thereby made possible.

Although reasonable latitude in respect to the roasting temperatures is permissible, 475° C. may be regarded as an extreme upper limit seldom advisable to attain. This temperature is so far above the point at which vanadium sulphate begins to decompose (approximately 410° C.) that the roast, especially if such high temperature were maintained for any substantial period of time, would contain too large a proportion of vanadium in insoluble form. Generally speaking, therefore, it is most desirable to keep the roasting temperature well below the aforesaid maximum of 475° C., much better results being obtained if the temperature is not permitted to exceed about 450° C. for any length of time, and ordinarily it is best to stay within a range of 380° to 430° C. At temperatures below 290° C., the sulphatizing reaction is apt to proceed too slowly for profitable commercial operation. In the majority of cases, still closer control and regulation of the roasting temperature to keep it within the range 390° to 410° C. is optimum practice. As a rule, satisfactory solubilization is obtained under these conditions when a given particle of the ore remains in the roasting zone for approximately 45 minutes. This time or duration of roasting is of course not rigidly fixed but may vary considerably, the specific time here given being merely indicative of good practice in treating an average ore of the typical composition hereinabove assumed for the purposes of this specific illustrative example. For reasons hereinabove stated, it is advantageous to have the roasting of the indicated relatively short duration; but roasting periods of considerably longer duration, e. g. as long as 1½ to 2 hours, or even longer, are permissible within the broad scope of the invention although seldom necessary and distinctly less desirable.

The hot roasted mixture, as it is discharged from the rotary roasting furnace or kiln, is dropped into water in a dissolver-classifier of the counter-current type generally well known in the art. Here it is mixed with an amount of water requisite to form a solution of predetermined desired concentration found to be most suitable in the ensuing steps of the process. To this end, the supply of water to the dissolver-classifier is controlled to give a leach solution having a specific gravity within the approximate range of from 1.08 to 1.40, measured cold, a specific gravity of about 1.24 being ordinarily about optimum. However, the specific gravity may vary considerably, depending upon a number of factors, including the particular ore composition. Any excess ammonium sulphate remaining in the roast after heating and dissolving in the leach liquor increases the solvent power of the leach and favors more complete recovery of solubles.

The resultant leach solution, containing the dissolved vanadium and uranium values as sulphates and carrying as suspended slimes practically all the radium values contained in the original ore, is discharged relatively hot from the lower end of the dissolver-classifier. It is usually acid in reaction, and this acidity is next reduced to a point most favorable for the ensuing alum crystallization by adding a suitable neutralizing agent. Concentrated aqua ammonia may be used for this purpose; but in actual practice it is more desirable and economical to effect the desired degree of neutralization either wholly or in part by adding an iron-containing precipitate obtained from a later stage of the process, as will be presently described. The discharge from the upper end of the dissolver-classifier consists of tailings which have been washed free from soluble salts. These tailings carry no values in significant amount and are discarded.

The leach solution is filtered to remove the suspended radium slimes, the press cake being washed free of vanadium and uranium values. The press cake contains practically all the radium values of the original ore in relatively highly concentrated form suitable to be worked up by known methods for production of commercial radium.

As typical of good practice, the volume of the leach solution may amount to about 8 gallons per 100 pounds of ore; and the principal dissolved contents, all present as sulphates, may be approximately as follows:

|  | Grams per liter |
|---|---|
| Vanadium metal | 100 to 111 |
| Uranium metal | 8.5 to 10.5 |
| Ferrous sulphate | 26 to 30 |
| Aluminum sulphate | 240 to 250 |
| Magnesium sulphate | 38 to 45 |

If the filtered leach solution does not already contain sufficient ammonium sulphate from the excess employed in the roasting operation to provide for formation of the iron and aluminum alums (iron ammonium sulphate and aluminum ammonium sulphate), a further quantity sufficient for that purpose is added to the solution, agitation and heating being continued until all the ammonium sulphate is dissolved. The solution is then allowed to cool, whereupon aluminum alum crystallizes out, the crystals being separated from the mother liquor and dried by centrifuging. The mother liquor is now further concentrated by evaporation to a point, say to a volume of about 2.75 gallons per 100 pounds of ore, where iron alum readily crystallizes out. The resultant crystals, largely iron alum, are separated and dried by centrifuging.

The alums thus obtained as by-products of the process have some commercial value, and their removal from the soluton has the further advantage that it enables obtaining at a later stage a more complete precipitation of hydrated vanadium oxide and in higher purity.

The mother liquor from the iron alum crystallization is now diluted considerably, for example with from two to eight or more times its volume of water, preparatory to precipitating the vanadium values therefrom. Most desirably, the dilution is such as will adjust the concentration of vanadium values in the solution to about 40 grams $V_2O_5$ per liter. The acidity of the solution is reduced, most desirably to a pH value not lower than about 2.0, by adding a suitable alkali or base, such as ammonium hydroxide. Iron hydroxide precipitated after removal of vanadium as hereinafter described, supplemented if necessary by basic iron sulphate also precipitated in another specific procedure to be presently set forth, may also be used for effecting the reduction in acidity, thereby effecting desirable economy and efficiency of operation. Sodium chlorate or other suitable oxidizing agent is then added in slight (e. g. 10 per cent) excess over what is theoretically required to oxidize the total oxidizable material in the solution, the acid solution being boiled vigorously until analysis of the solution shows the vanadium to be satisfactorily hydrolyzed and precipitated. Ordinarily, with the type of ore here in question, this will be found to have occurred after about two hours' boiling and increase in the acidity of the solution to about pH 1.20–1.40, say pH 1.35 in a typical instance. If desired, more ammonium hydroxide or iron hydroxide (or basic sulphate) precipitate may be added during the boiling to maintain the acidity substantially constant. The solution is then filtered and the vanadium precipitate, after being washed with hot water, is dried and ignited to vanadium pentoxide. It will ordinarily analyze 85 to 95 per vent $V_2O_5$, the recovery from the solution averaging 90 to 95 per cent.

The clear solution from which the vanadium has been removed is now treated to effect removal of any residual iron and aluminum that may still be present, together with other impurities such as magnesium and copper, and to ensure complete solubility of the uranium. In one desirable way of doing this, the solution is made distinctly alkaline by adding sodium carbonate and is then boiled. The resultant iron-containing precipitate, consisting largely of iron and aluminum hydroxides, is removed by filtration and washed, the washed precipitate being advantageously used to reduce the acidity of the initial acid leach solution and, if desired, to maintain constant acidity during the vanadium hydrolyzation, as hereinabove described. Since this precipitate also contains whatever small amount of vanadium may have escaped hydrolyzation and precipitation in the vanadium-precipitating step, together with any insoluble or adsorbed uranium, this expedient of returning the precipitate to the process in cycle is particularly advantageous as making for high efficiency in the recovery of the vanadium and uranium values. In a typical instance, the precipitate of iron and aluminum hydroxides may contain on the order of 6 per cent by weight of vanadium and uranium oxides together, with vanadium oxide predominating. Moreover, since the use of ammonia in reducing the acidity of the initial leach solution can thus be wholly or partly done away with, a further substantial saving is effected.

Although the method which has just been described for purifying the filtrate from the vanadium precipitation is regarded as especially desirable, another good method comprises evaporating the solution to a volume of about 1.5 gallons or less per 100 pounds of ore, and heating it at this volume for approximately 2 hours. The precipitate formed is largely basic iron (and aluminum) sulphate, and is substantially free of vanadium and uranium values. After being filtered off and washed, this precipitate may be discarded, although some of it may be used to supplement the action of the iron hydroxide precipitate later obtained, in reducing the acidity of the leach solution. The filtrate is allowed to cool, whereupon crude ammonium sulphate crystallizes out in sufficient quantity and value to warrant re-use in the process, as in that stage, for example, where it may be necessary to add ammonium sulphate to the clear leach solution prior to crystallizing out aluminum and iron alums. Crystallizing out the crude ammonium sulphate is also a means of removing slight residual quantities of impurities, which, in addition to iron, may include aluminum, magnesium and copper. At this stage, the solution, which may have an approximate volume of 1 gallon per 100 pounds of ore, is diluted to 6 gallons, and sodium carbonate is then added to an excess which may amount to 1 pound for each 6 gallons. After digesting the solution for about an hour at 90° C., the resultant precipitate of iron hydroxide (carrying vanadium and uranium values as before, and some or all of the impurities above mentioned), is filtered off and washed. This iron-hydroxide precipitate obtained in this alternative procedure is advantageously used, as before described, in reducing the acidity of the initial leach solution and maintaining the desired acidity during the hydrolysis of vanadic acid; and if an insufficient quantity thereof is available for the purpose, some of the above mentioned basic iron sulphate precipitate may also be used.

Whichever of the foregoing procedures is used for purifying the filtrate from the vanadium precipitation, the resultant clear alkaline filtrate is then suitably treated to remove carbon dioxide, most desirably by neutralizing the solution with sulphuric acid in slight excess and boiling vigorously for an hour or so until the carbon dioxide has been expelled. A solution of sodium hydroxide in sufficient quantity to convert the uranium values into sodium uranate (e. g. about 0.070 pound NaOH per 100 pounds of ore) is then added, and the liquid is heated to boiling and allowed to stand, the resultant precipitate of sodium uranate being filtered off, washed, dried, etc. The purity of this product is ordinarily between 87 and 97 per cent, and the recovery from the solution is virtually complete.

Experience in treating carnotite-roscoelite and other ores of the general character described according to the novel process hereinabove described has demonstrated that the process is effective to enable recovery of virtually all of the vanadium content as vanadium pentoxide of relatively very high purity, and recovery of as much as 98 per cent of uranium content in the form of sodium uranate also of high purity. In addition, the novel process enables recovery of 86 per cent or more of the radium values in the form of slimes having a radium concentration approximately at least twelve times that existing in the original ore.

It will be understood that in practicing the invention considerable latitude is permissible with respect to the operating details, those given in the foregoing specific illustrative example merely representing typical good practice within the scope of the invention as defined by the appended claims.

What I claim is:

1. The process of treating siliceous ores carrying vanadium, uranium and radium values, which comprises mixing with such an ore in comminuted condition a quantity of ammonium sulphate sufficient for reaction with the sulphate-forming components thereof, subjecting the mix in dry condition to regulated moderate heating, with access of air, at reacting temperature not exceeding about 475° C. as a maximum until adequate sulphatization of the vanadium and uranium values is effected, leaching the resultant product with water to extract the solubilized values, separating the resultant leach solution together with suspended radium slimes from the undissolved residue, separating said slimes from the leach solution, and subjecting the clarified solution to appropriate treatment for recovery therefrom of its contained vanadium and uranium values.

2. The process defined in claim 1, further characterized by the fact that the mixture of ore and ammonium sulphate is heated mainly at temperatures between 290° and 450° C.

3. The process defined in claim 1, further characterized by the fact that the mixture of ore and ammonium sulphate is heated mainly at temperatures within the approximate range of 390° to 410° C.

4. The process of treating siliceous ores carrying vanadium, uranium and radium values and containing compounds of aluminum and iron, which comprises subjecting the mixture of the comminuted ore with ammonium sulphate to a low-temperature roast, leaching the roasted product with water, separating the resultant leach solution carrying suspended radium slimes from the undissolved residue, separating said slimes from the leach solution, removing most of the aluminum and iron content of the solution by crystallizing aluminum and iron alums therefrom, and then subjecting the solution to appropriate treatment for recovery of its contained vanadium and uranium values.

5. The process of treating siliceous ores carrying vanadium, uranium and radium values and containing compounds of aluminum and iron, which comprises subjecting the mixture of the comminuted ore with ammonium sulphate to a low-temperature roast, leaching the hot roasted product with water under conditions regulated and controlled to produce a leach solution having a specific gravity (measured cold) of from about 1.08 to 1.40, separating the resultant hot leach solution from the undissolved residue and freeing said solution from suspended radium slimes, adding to the solution such quantity of ammonium sulphate as may be necessary to enable the iron and aluminum contained therein to form the corresponding alums, crystallizing and separating aluminum alum from the cooled solution, concentrating the residual mother liquor, crystallizing and separating iron alum from the concentrated and cooled mother liquor, diluting the residual solution and reducing its acidity, adding a suitable oxidizing agent and boiling until the vanadium content has been largely hydrolyzed and precipitated, separating the vanadium precipitate, subjecting the residual solution to suitable treatment, including neutralization and heating, for precipitation of further small amounts of impurities including iron and aluminum, separating the resultant precipitate, substantially freeing the residual solution of carbon dioxide, adding sodium hydroxide thereto to precipitate uranium as sodium uranate, and separating the resultant precipitate.

6. The process as defined in claim 5, further characterized by the fact that the iron-containing precipitate obtained from the solution after precipitation of vanadium values is utilized as a neutralizing agent in a preceding step.

7. The process defined in claim 5, further characterized by the fact that the iron-containing precipitate obtained from the solution after precipitation of vanadium values is utilized in reducing the acidity of the initial leach solution.

8. The process defined in claim 5, further characterized by the fact that the iron-containing precipitate obtained from the solution after precipitation of vanadium values is utilized in reducing the acidity of said residual solution from which the vanadium values are precipitated.

9. The process defined in claim 5, further characterized by the fact that the acidity of said residual solution from which the vanadium values are precipitated is adjusted to an initial pH value of not less than about 2.0.

10. The process defined in claim 5, further characterized by the fact that the acidity of said residual solution from which the vanadium values are precipitated is adjusted to an initial pH value not less than about 2.0, and that the solution is boiled until it shows a pH value within the approximate range of 1.20 to 1.40.

11. The process defined in claim 5, further characterized by the fact that such excess of ammonium sulphate is employed in the mixture subjected to the low-temperature roast as will ensure some ammonium sulphate remaining in the roasted mixture and dissolving in the leach solution, thereby increasing the solvent power of said solution for soluble values.

12. The process defined in claim 1, further characterized by the fact that such excess of ammonium sulphate is employed in the sulphatizing mix as will ensure some ammonium sulphate remaining in the heated mix and dissolving in the leach solution, thereby increasing the solvent power of said solution for soluble values.

HARRY McCORMACK.